United States Patent
Hancock et al.

(10) Patent No.: US 9,430,988 B1
(45) Date of Patent: Aug. 30, 2016

(54) MOBILE DEVICE WITH LOW-EMISSION MODE

(71) Applicant: BlueStream Development, LLC, Gilbert, AZ (US)

(72) Inventors: Charles K Hancock, Queen Creek, AZ (US); Kevin J Hancock, Gllbert, AZ (US)

(73) Assignee: BLUESTREAM DEVELOPMENT, LLC, Glibert, AZ (US)

( * ) Notice: Subject to any disclaimer, the term of this patent is extended or adjusted under 35 U.S.C. 154(b) by 0 days.

(21) Appl. No.: 14/679,994

(22) Filed: Apr. 6, 2015

(51) Int. Cl.
| | |
|---|---|
| *G09G 3/36* | (2006.01) |
| *G09G 5/10* | (2006.01) |
| *G09G 5/00* | (2006.01) |
| *G09G 5/02* | (2006.01) |
| *G06F 3/041* | (2006.01) |
| *G06F 3/0488* | (2013.01) |

(52) U.S. Cl.
CPC ............... *G09G 5/10* (2013.01); *G06F 3/0412* (2013.01); *G06F 3/04886* (2013.01); *G09G 5/003* (2013.01); *G09G 5/02* (2013.01); *G09G 2320/0606* (2013.01); *G09G 2320/0613* (2013.01); *G09G 2320/0626* (2013.01); *G09G 2320/0666* (2013.01); *G09G 2320/08* (2013.01); *G09G 2354/00* (2013.01)

(58) Field of Classification Search
CPC .. G06F 1/3203; G06F 1/3026; G06F 1/3265; G06F 3/0481; G06F 3/0412; G06F 3/04886; G09G 5/02; G09G 2330/021; G09G 2300/0452; G09G 5/10; G09G 5/003; G09G 2354/00; G09G 2320/0626; G09G 2320/0666; G09G 2320/08; G09G 2320/0606; G09G 2320/0613

See application file for complete search history.

(56) References Cited

U.S. PATENT DOCUMENTS

| | | | |
|---|---|---|---|
| 6,788,308 B2 | 9/2004 | Reavy et al. | |
| 7,038,641 B2 | 5/2006 | Hirota et al. | |
| 7,312,771 B2 * | 12/2007 | Iwamura | 345/76 |
| 7,420,551 B2 * | 9/2008 | Kota et al. | 345/211 |
| 7,532,181 B2 * | 5/2009 | Tang et al. | 345/76 |
| 7,657,849 B2 * | 2/2010 | Chaudhri | G06F 3/04883 345/173 |
| 8,102,341 B2 * | 1/2012 | Shen | 345/88 |
| 8,233,863 B2 | 7/2012 | Kim | |
| 8,280,363 B2 * | 10/2012 | Yoo | 455/418 |
| 8,294,638 B2 * | 10/2012 | Iwamura | 345/76 |
| 8,364,857 B2 * | 1/2013 | Pyers et al. | 710/14 |
| 8,382,297 B2 * | 2/2013 | Nicholson et al. | 353/122 |
| 8,384,780 B1 * | 2/2013 | Frank et al. | 348/148 |

(Continued)

OTHER PUBLICATIONS

Jimmy Chen, Eyes Protector (Night Mode), https://play.google.com/store/apps/details?id=com.jimmychen.app.eyesprotector&hl=en, Published Aug. 10, 2014.

(Continued)

*Primary Examiner* — Lun-Yi Lao
*Assistant Examiner* — Peter D McLoone
(74) *Attorney, Agent, or Firm* — Wayne Carroll; Inspired Idea Solutions Law Firm (57) ABSTRACT

A mobile electronic device is disclosed with a low emission mode that limits the emission of light from the display to frequency ranges that have low reflection off of human skin. The display may be limited to images and text displayed in a red color. The low emission mode may also prevent sound from the mobile electronic device and allow text based sending and receiving of information in a low lit environment with minimal or no disturbance to users around the user of the mobile electronic device.

17 Claims, 6 Drawing Sheets

(56) References Cited

U.S. PATENT DOCUMENTS

| | | | |
|---|---|---|---|
| 8,480,281 B2* | 7/2013 | Dunn et al. | 362/606 |
| 8,483,772 B2* | 7/2013 | Naftolin | H04M 1/72569 |
| | | | 345/102 |
| 8,643,287 B2* | 2/2014 | Jou | 315/156 |
| 8,659,661 B2* | 2/2014 | Frank et al. | 348/148 |
| 8,749,635 B2* | 6/2014 | Hogasten et al. | 348/164 |
| 8,751,838 B2* | 6/2014 | Nurmi | 713/320 |
| 8,840,249 B2* | 9/2014 | Nicholson et al. | 353/30 |
| 8,892,169 B2 | 11/2014 | Nakahara | |
| 8,934,879 B2* | 1/2015 | Naftolin | H04M 1/72569 |
| | | | 455/414.1 |
| 9,182,801 B2* | 11/2015 | Lozovoy | H04M 1/22 |
| 9,280,280 B2* | 3/2016 | Dearman | H04M 1/72544 |
| 2005/0037815 A1 | 2/2005 | Besharat et al. | |
| 2005/0057462 A1* | 3/2005 | Kota et al. | 345/76 |
| 2005/0110717 A1* | 5/2005 | Iwamura | 345/76 |
| 2006/0063563 A1* | 3/2006 | Kaufman | H04M 1/663 |
| | | | 455/556.2 |
| 2007/0018915 A1* | 1/2007 | Tang et al. | 345/76 |
| 2007/0046618 A1* | 3/2007 | Imai | 345/102 |
| 2007/0150842 A1* | 6/2007 | Chaudhri | G06F 3/04883 |
| | | | 715/863 |
| 2008/0133949 A1* | 6/2008 | Iwamura | 713/320 |
| 2010/0105442 A1* | 4/2010 | Yoo | 455/566 |
| 2010/0110308 A1* | 5/2010 | Nicholson et al. | 348/744 |
| 2010/0149081 A1* | 6/2010 | Shen | 345/88 |
| 2010/0309096 A1 | 12/2010 | Inoh | |
| 2010/0309315 A1* | 12/2010 | Hogasten et al. | 348/164 |
| 2011/0055434 A1* | 3/2011 | Pyers et al. | 710/14 |
| 2011/0216050 A1 | 9/2011 | Kim et al. | |
| 2011/0242839 A1* | 10/2011 | Dunn et al. | 362/606 |
| 2012/0047380 A1* | 2/2012 | Nurmi | 713/320 |
| 2012/0162544 A1* | 6/2012 | Nicholson et al. | 348/744 |
| 2012/0218282 A1* | 8/2012 | Choboter | G09G 5/00 |
| | | | 345/589 |
| 2012/0319593 A1* | 12/2012 | Jou | 315/152 |
| 2013/0012270 A1* | 1/2013 | Naftolin | H04M 1/72569 |
| | | | 455/566 |
| 2013/0111415 A1* | 5/2013 | Newman et al. | 715/864 |
| 2013/0132750 A1* | 5/2013 | Werner et al. | 713/323 |
| 2013/0147964 A1* | 6/2013 | Frank et al. | 348/159 |
| 2013/0201204 A1 | 8/2013 | Li | |
| 2013/0232332 A1* | 9/2013 | Naftolin | H04M 1/72569 |
| | | | 713/100 |
| 2013/0275899 A1* | 10/2013 | Schubert | G06F 3/0481 |
| | | | 715/765 |
| 2014/0035804 A1* | 2/2014 | Dearman | 345/156 |
| 2014/0094224 A1* | 4/2014 | Lozovoy | H04M 1/22 |
| | | | 455/566 |
| 2014/0099997 A1 | 4/2014 | Nakahara | |
| 2014/0106821 A1* | 4/2014 | Nakahara | H04M 1/22 |
| | | | 455/566 |
| 2014/0160007 A1* | 6/2014 | Lee | G06F 1/3218 |
| | | | 345/156 |
| 2014/0168439 A1* | 6/2014 | Frank et al. | 348/148 |
| 2014/0285672 A1* | 9/2014 | Hogasten et al. | 348/164 |
| 2014/0333602 A1* | 11/2014 | Yang et al. | 345/212 |
| 2014/0344608 A1* | 11/2014 | Wang | 713/324 |
| 2014/0359334 A1* | 12/2014 | Kutch et al. | 713/324 |
| 2015/0061988 A1* | 3/2015 | Galu, Jr. | G06F 1/3265 |
| | | | 345/102 |
| 2015/0062196 A1* | 3/2015 | Tripathi | 345/690 |
| 2015/0170605 A1* | 6/2015 | Watakabe et al. | 349/106 |
| 2015/0172443 A1* | 6/2015 | Naftolin | H04M 1/72569 |
| | | | 455/418 |
| 2015/0172444 A1* | 6/2015 | Naftolin | H04M 1/72569 |
| | | | 455/418 |
| 2015/0185811 A1* | 7/2015 | Connell | G06F 1/3265 |
| | | | 345/173 |

OTHER PUBLICATIONS

Bruno Barao, Night Mode, https://play.google.com/store/apps/details?id=pt.bbarao.nightunode&hl=en, Published Aug. 8, 2013.

Xavier Harding, iOS 7 Jailbreak App: Nightmode Vs. Eclipse Vs. UIColors, Which Cydia Tweak is Best for Using Your iPhone at Night?, http://www.idigitaltimes.com/ios-7-jailbreak-app-nightmode-vs-eclipse-vs-uicolors-which-cydia-tweak-best-using-your-iphone-night, Published Feb. 19, 2014.

Danny Sandler, Nightmode Tweak Darkens iOS 7, http://www.todaysiphone.com/2014/02/preview-nightmode-tweak/, Published Feb. 17, 2014.

Rafal Mantiuk, Allan G. Rempel, Wolfgang Heidrich, Display Considerations for Night and Low-Illumination Viewing, The University of British Columbia, https://www.cs.ubc.ca/~heidrich/Papers/APGV.09_1.pdf.

Jason Cipriani, How to Adjust Tweetbot's new Night Theme for iOS, http://www.cnet.com/how-to/how-to-adjust-tweetbots-new-night-theme-for-ios/, Published Nov. 28, 2013.

Lauren Johnson, EBay, Zappos Get First-Mover Advantage with iOS 7 app Updates, http://www.mobilecommercedaily.com/retailers-get-first-mover-advantage-with-ios-7-app-updates, Published Sep. 19, 2013.

Pollanza, Go SMS Theme Dark Red Black, https://play.google.com/store/apps/details?id=com.jb.gosms.theme.blackred&hl=en, Published May 17, 2013.

Melanie Pinola, Invert Your Phone's Colors to Text in the Dark Without Annoying Others, http://lifehacker.com/invert-your-phones-colors-to-text-in-the-dark-without-1342297195, Published Sep. 18, 2013.

* cited by examiner

MOBILE DEVICE WITH LOW-EMISSION MODE

BACKGROUND

1. Technical Field

This disclosure relates to mobile devices, and computer graphics processing for mobile devices, and more specifically processing of color and intensity attributes.

2. Background

Mobile devices are used in many settings including settings that have little or no light. When the mobile devices are used in this setting, light is emitted from the display or other parts of the mobile device. The emitted light from the mobile device has the potential to reflect off of the face of the mobile device user, and disturb people around the user. Other functions of an electronic device may also disturb others in settings such as a theater, concert hall, or observatory. Many mobile devices are not used effectively in low-lit environments because of the disturbance that is caused when the device is used. There is a need to improve the display of a mobile device, for example a low emission mode on a mobile device to reduce the light that is reflected off of the face or skin of a mobile device user.

BRIEF SUMMARY

A method of reducing light emission of a hand-held electronic communication device with a display is disclosed. The method may include the following steps: receiving a command, by a processor, to change a display mode of the hand-held electronic communication device, and changing the display from a normal mode to a low-emission mode in response to the command to change the display mode of the hand-held electronic communication device. The normal mode may emit light from the display that includes white light, and the low-emission mode may change substantially all light emitted from the display to be in one or more frequency ranges that are substantially absorbed by human skin.

Changing the display to a low-emission mode of the hand-held electronic communication device may include restricting light emitted from the display to be in the frequency range of 405 to 480 THz to substantially restrict the light to only light which is absorbed by human skin. The low-emission mode may include light emitted from the display as red colored light. In other embodiments the low-emission mode may include light emitted from the display as green or blue colored light.

The hand-held electronic communication device may have a speaker control system and a speaker. The method may also include changing the speaker control system to a silent mode in response to the command to change the display mode of the hand-held electronic communication device. The silent mode does not allow the speaker to emit sound thereby reducing or preventing disturbance to people around the user of the hand-held electronic communication device.

In an example embodiment the display is a touch screen display, and the touch screen display has a keyboard function that allows the display to accept keyboard input by representing a keyboard on the touch screen display. The touch screen display recognizes contact with the keyboard as input. The method may also include changing the keyboard function to display the keyboard on the touch screen display with a black background and keyboard keys in one or more of the frequencies of light that is substantially absorbed by human skin.

The display may have a control to adjust an intensity of one or more elements of the display, so that the light emitted from the one or more elements of the display is adjusted from a lowest intensity to a highest intensity. The low-emission mode may change the intensity of one or more elements of the display to an intensity that is less than the highest intensity. The low-emission mode may change the intensity of one or more elements of the display to an intensity that is less than fifty percent of the highest intensity.

The low-emission mode may be used for displaying text communication in a low-lit environment. The hand-held electronic communication device may deliver notifications to the display regarding communications. The method may also include displaying the notifications in the low-emission mode in response to the command to change the display mode of the hand-held electronic communication device. The notifications may include a call notification of a current attempt for real-time voice communication by a caller, wherein the call notification includes displaying an option to exit low emission mode and begin voice communication with the caller. Voice communication may include, but is not limited to: a phone call over a cell network, a voice over internet protocol (VOIP) call using a data communication network, a video call using an application, and voice communication through a website.

Receiving the command to change the display mode of the hand-held electronic communication device may further include receiving input from a user to immediately place the hand-held electronic communication device into the low-emission mode. In another embodiment receiving the command to change the display mode of the hand-held electronic communication device may include receiving input through wireless communication from an external source with direction to place the hand-held electronic communication device into the low-emission mode.

Receiving the command to change the display mode of the hand-held electronic communication device may also include receiving input to change the display mode of the hand-held electronic communication device to the low-emission mode for a specified time period. In another embodiment receiving the command to change the display mode of the hand-held electronic communication device may include receiving input to change the display mode of the hand-held electronic communication device to the low-emission mode at a future specified time.

The low-emission mode may allow two or more text based communication programs to operate with the hand-held electronic communication device in low-emission mode.

A hand-held electronic communication device is disclosed, which may include a display; memory; one or more processors; and one or more modules stored in the memory and configured for execution by the one or more processors, the modules may include the following instructions: receiving a command to change a display mode of the hand-held electronic communication device and; changing the display to a low-emission mode in response to the command to change the display mode of the hand-held electronic communication device. The low-emission mode may change substantially all light emitted from the display to be in one or more frequencies of light that is substantially absorbed by human skin.

Another embodiment is disclosed as a computer readable storage medium storing one or more programs. The programs may include instructions, which when executed by a hand-held electronic communication device with a display, cause the hand-held electronic communication device to perform a method that may include the following steps. Receiving a command to change a display mode of the hand-held electronic communication device; changing the display to a low-emission mode in response to the command to change the display mode of the hand-held electronic communication device. The low-emission mode may change substantially all light emitted from the display to be in one or more frequencies of light that is substantially absorbed by human skin.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A mobile electronic device may have a normal mode for a display. In some embodiments the normal mode is designed for use in well-lit areas and uses multiple colors including white light emitted from the display. The normal mode may include a setting to adjust the brightness of the display, including an automated system to adjust the brightness of the display based on sensors detecting whether the mobile device is in a well-lit environment. The normal mode primarily adjusts the brightness of the display, and does not change the colors of the display. When the display emits white light, emitted frequency ranges include light that reflects off of the skin of the user. When light reflects off the skin of a user, such as their face, the reflected light may disturb people around the user in some settings.

An application on a mobile electronic device may provide a low emission mode. In an example embodiment a user directs an application to change the mode of the mobile device to a low emission mode, and the mobile device then displays the background as black or as another dark color, and the text, pictures and other symbols with a lower intensity. All text, symbols and images in this example are in a color that has low reflection off of human skin, or which is substantially absorbed by human skin, such as a red color, or in the frequency range of 405 THz to 480 THz. In the low emission mode the mobile device may also limit sounds emitted from the mobile device.

Figure 1:
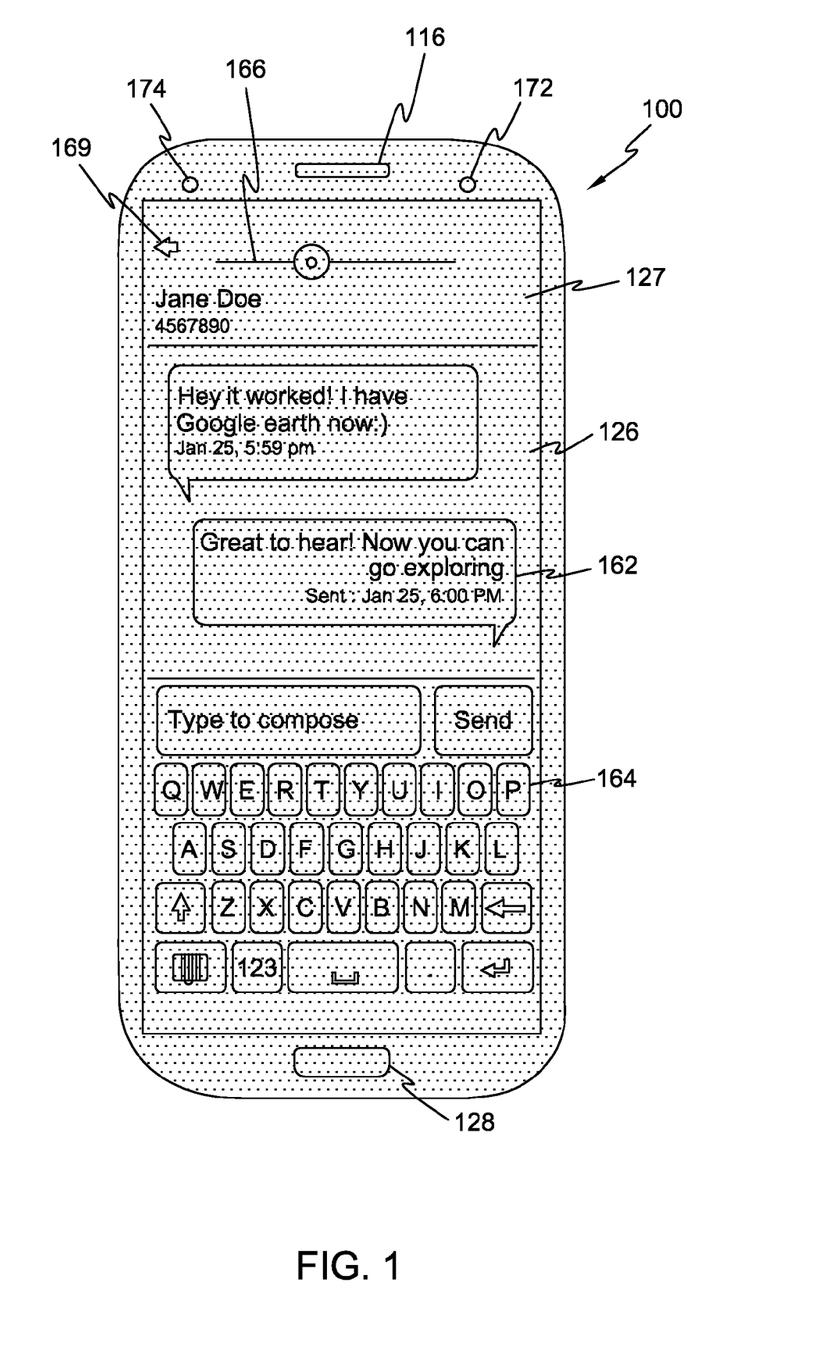
FIG. 1 is a view of a mobile electronic device with an embodiment of a low emission mode in a texting application.
Figure 2:
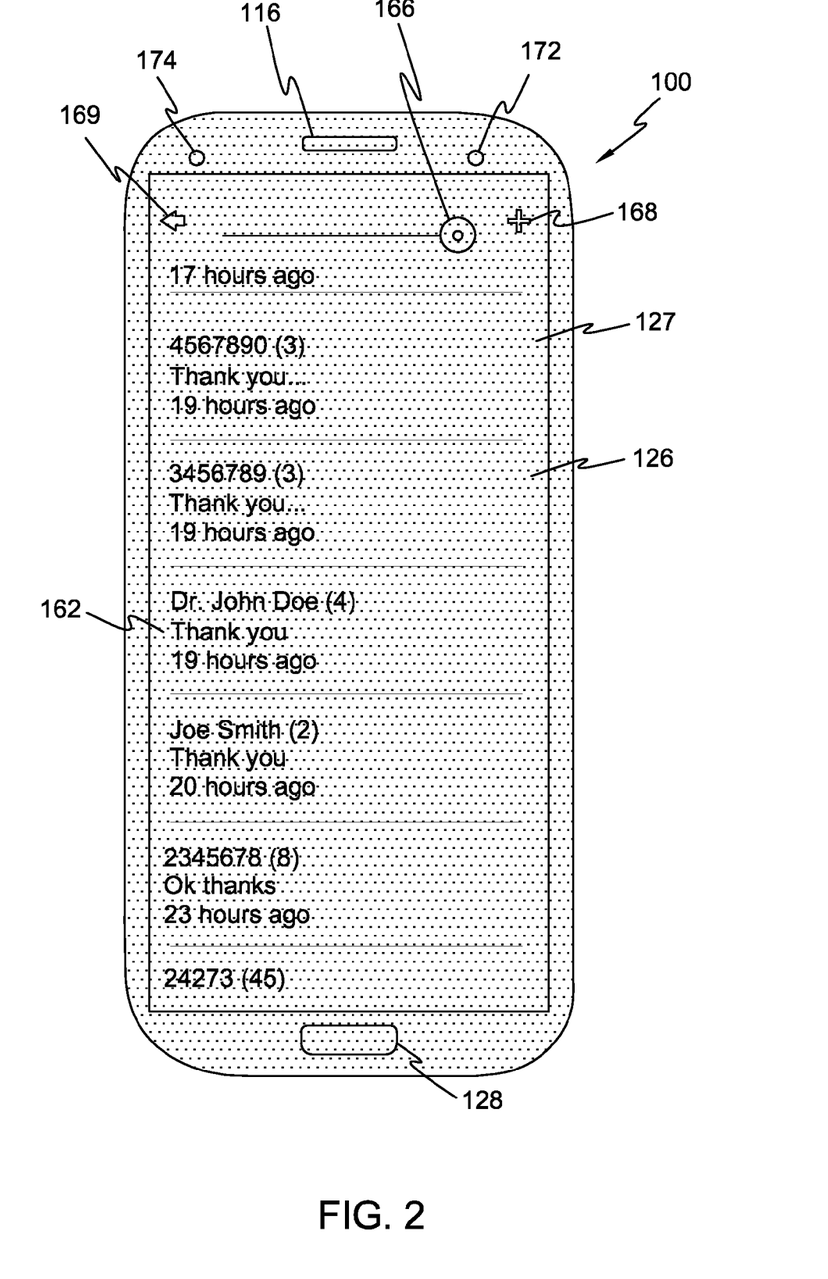
FIG. 2 is another view of a mobile electronic device with an embodiment of a low emission mode in a texting application.
Figure 3:
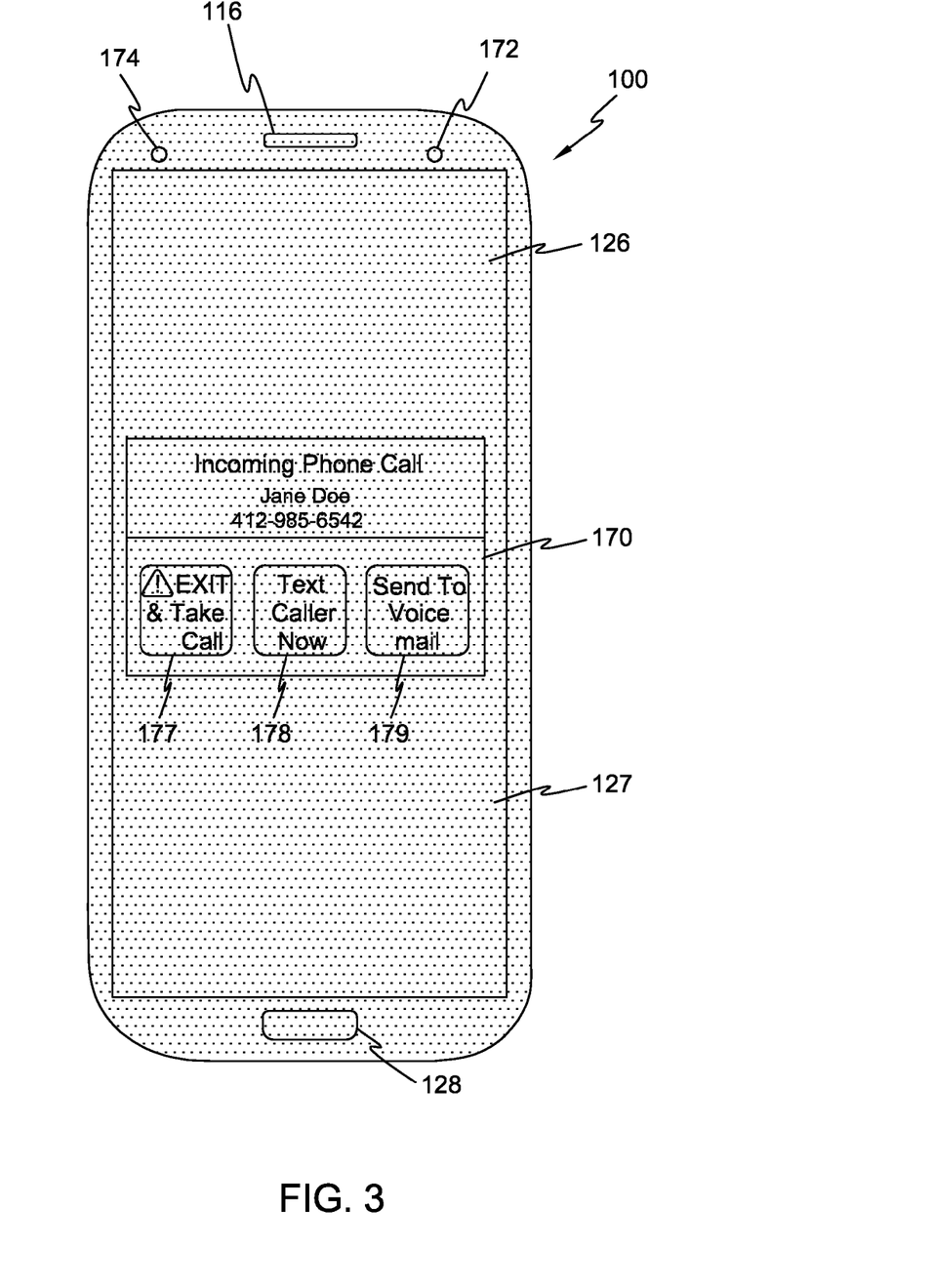
FIG. 3 is a view of a mobile electronic device with an embodiment of a low emission mode with a phone call notification.

FIGS. 1, 2 and 3 show an example mobile electronic device 100, which may be a mobile device in a low emission mode. FIGS. 1 and 2 show a texting application in a low emission mode, with FIG. 1 in a conversation, and FIG. 2 showing a list of conversations. FIG. 3 shows a notification 170 indicating an incoming phone call while in a low emission mode.

The example mobile electronic device 100 has a touch screen 126 with a background 127 (shown as stippling) and displayed text and symbols 162. In the example illustrations of FIGS. 1, 2 and 3 the electronic device is black and the color black is shown with the stippling feature. The text and symbols 162 may include a keyboard 164, a back arrow 169, an intensity adjustment 166, text messages or other text communications. Other symbols or images may also be for communication or as navigation buttons on the touch screen 126, such as a navigation button 168 to open a new text message. In the example embodiment all of the displayed text and symbols are displayed in a color that has a low reflection off of the skin of a user, such as a red color. The drawings are prepared in black and white, but all pixels shown in the drawings as text or images may be displayed on the device 100 as a red color, or other color that is substantially absorbed by human skin or has a low reflection off of human skin.

The example mobile electronic device 100 may have additional components that emit light other than the touch screen 126. A status LED 172, for example may emit light to indicate the state of the battery of the electronic device 100, or for other reasons. In an example embodiment the electronic device 100 is configured so that when a user selects a low emission mode, the status led 172 is disabled or configured to only emit red light.

The mobile electronic device 100 may also include one or more cameras 174 or light sensors which may be on the front and the back of the mobile electronic device 100. The cameras 174 may be used to detect a condition when a low emission mode is desirable, such as when one or more cameras 174 detect a dark environment. The cameras or other light sensors may also detect when the environment is lit and therefore a low emissions mode is no longer desirable.

One or more speakers 116 may be included on the mobile electronic device 100, including on the front and the back of the mobile electronic device 100. In an example low emission mode, speakers 116 may be configured so that they do not emit any sound.

FIG. 3, shows an example embodiment of a notification 170 in low emission mode. The notification may show caller ID information and give the user options on how to handle the call. In this example there are three options for the user shown as interface objects or soft buttons. The first option 177 is to exit low emission mode and take the call. In this embodiment the low emission mode does not allow sound from the speakers, so taking a phone call or other real-time voice communication would require exiting the low emission mode. In some embodiments when a user selects to leave the low emission mode, a second screen is displayed to confirm that the user wishes to leave the low emission mode.

The second option 178 is to text the caller. With this option the mobile electronic device 100 can remain in low emission mode and a texting application can be opened when the user selects the second option 178. In some embodiments the texting application has an option to send a text message immediately after it is drafted, and an option to send the message at a later time.

The third option 179 is to send the call to voice mail. Selecting this option will leave the mobile electronic device 100 in low emission mode, and the caller will be directed to a voicemail that is associated with the mobile electronic device 100. If the user does not select any of these options and ignores the call, then the settings on the electronic device 100 or account associated with the electronic device may determine how the unanswered call is handled. For example the unanswered call may be sent to voice mail after a designated number of rings.

The mobile electronic device 100 may have additional buttons, functions and features which are known in the art, but are not shown in the drawings. The drawing shows one control device 128, which in this example is a home button. The mobile electronic device 100 may also have control devices 128 including but not limited to a power switch, a rocker switch, headphone and speaker jack, a charging and communications port and a touch pad.

Figure 4:
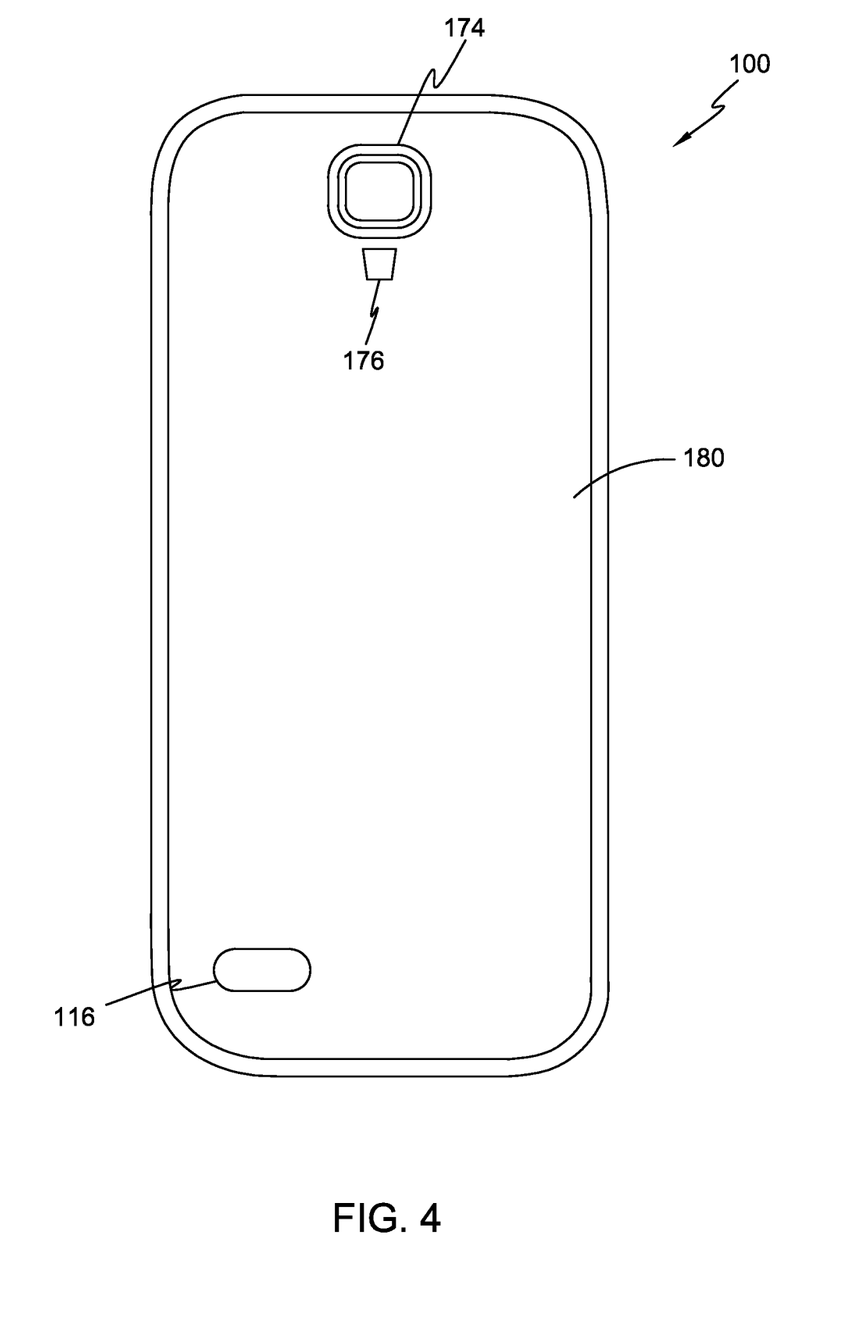
FIG. 4 is a view of the back of a mobile electronic device.

FIG. 4 is an illustration of the back 180 of an example embodiment of a mobile electronic device 100. In this example the mobile electronic device 100 has a cover with holes that expose the camera 174, flash 176 and the speaker 116.

Figure 5:
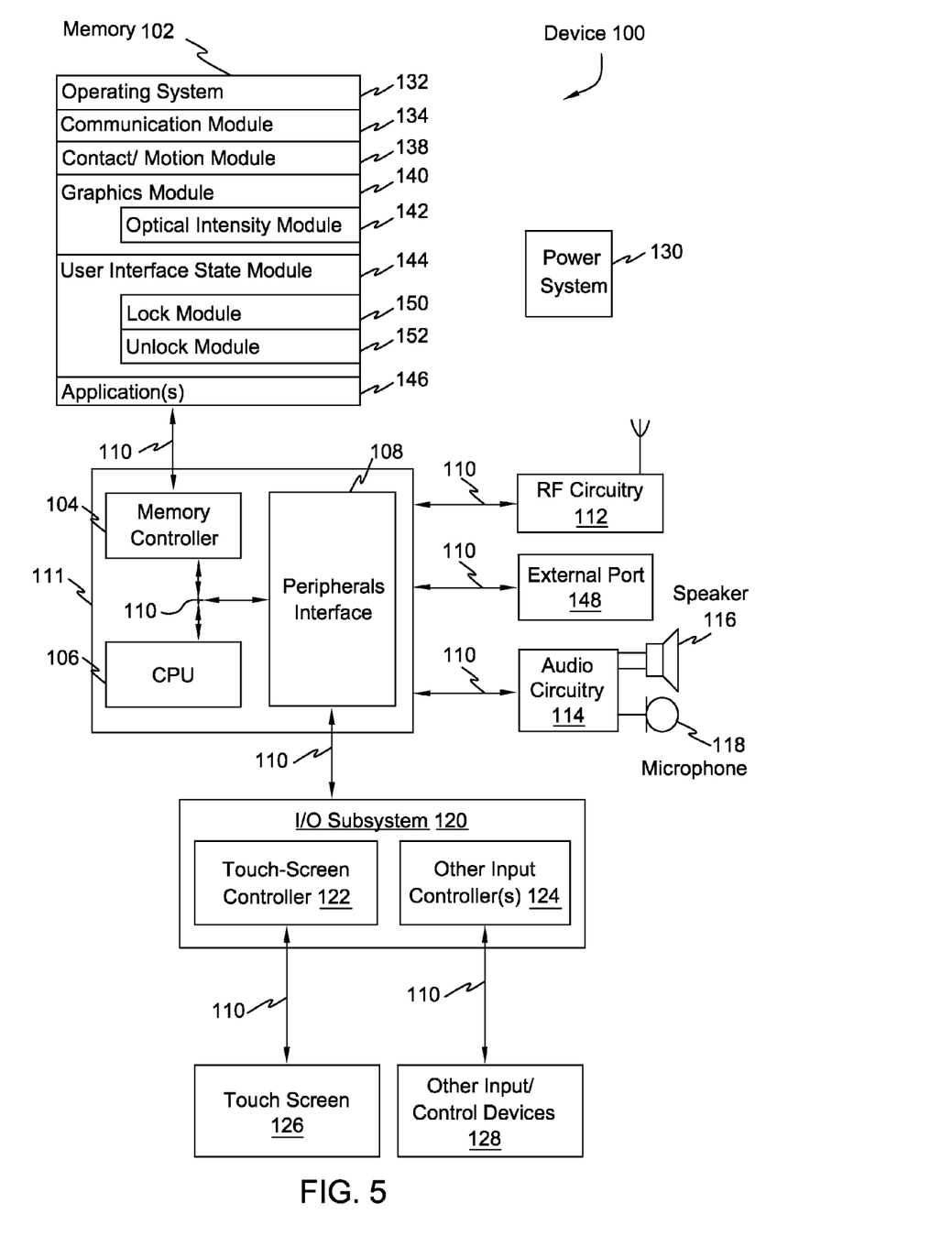
FIG. 5 is a system diagram of an embodiment of a mobile electronic device.

FIG. 5 illustrates an electronic device 100, according to some embodiments. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, laptop computer, a mobile phone, a digital watch or other "wearables", a media player, a personal digital assistant (PDA), or the like, including a combination of two or more of these items, and one or more of these items may be a hand-held electronic communication device. It should be appreciated that the device 100 is only one example of a hand held electronic communication device 100, and that the device 100 may have more or fewer components than shown, or a different configuration of components. The various components shown in FIG. 5 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to and from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker 116 converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects. The objects shown in FIG. 2 and FIG. 3, for example may be soft keys or soft buttons for user input.

The touch screen 126 also accepts input from the user based on haptic and/or tactile contact. The touch screen 126 forms a touch-sensitive surface that accepts user input. The touch screen 126 and the touch-screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch-screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The user may make contact with the touch screen 126 using any suitable object or appendage, such as a stylus, finger, and so forth.

In some embodiments, in addition to the touch screen 126, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 138 and the touch-screen controller 122 also detect contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state. Further details regarding the user interface states are described below.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In some embodiments, the device 100 includes the touch screen 126, the touchpad, a push button for powering the device on/off and locking the device, and a volume adjustment rocker button. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

In an example embodiment the low emission mode is a low emission application 146 that is activated by a user. Once activated the application 146 sends a message to the graphics module 140 to change the display to only show colors that have low reflection off of human skin, for example a red color. The low emission application 146 may also direct the graphics module 140 to load a keyboard that is only displayed in a red color, as well as notifications and icons that are only in a red color.

In some embodiments the keyboard is displayed in a low emission mode, and the function of the keyboard is based on programs installed on the electronic device. For example, a user may install an add-on keyboard application that learns the user's unique patters for typing on a touchscreen keyboard and makes it easier for the user to type or enter text information. The low emission mode may allow the function of the add-on keyboard application and have the keyboard displayed as the low emission mode keyboard, or another keyboard that limits light emitted to that light which is substantially absorbed by human skin.

When the low emission application 146 is activated the unlock module 152 may be directed to display an unlock screen that only shows a red color. In this manner a mobile electronic device 100 may be in low emission mode and in a locked state, and may remain in the low emission mode when a user desires to unlock the mobile electronic device 100.

In some embodiments the low emission mode may be activated through an external signal, such as a signal received through RF circuitry 112. For example, one or more Bluetooth broadcasters may be placed in a theatre or concert hall, and a mobile electronic device 100 with an example application may detect proximity to the Bluetooth broadcasters, and after detecting proximity of the Bluetooth broadcasters the application may activate low emission mode. The low emission mode may also be activated through other wireless communications, such as through a WAN or LAN connection, where signals direct the mobile electronic device 100 to enter low emission mode.

The low emission mode may also be activated by location. In some embodiments the low emission mode will be enabled when the user is at a specific location, which may be determined based on a GPS signal.

In some embodiments the low emission mode includes an option to turn on and adjust the flash 176. An example electronic device may allow the flash 176 to be turned on and off so that the user can use the flash 176 as a "flashlight". In some embodiments the flash 176 is disabled when the electronic device is in low emission mode, in other embodiments, however, the flash 176 may be enabled and may be useful. For example, the flash 176 may be used to read a program when a user is in attendance at a theater production. In some embodiments the flash 176 can be adjusted from a lower intensity to a higher intensity of light, and the low emission mode may allow a user to adjust the intensity of the flash 176.

In some embodiments the low emission mode allows a user to activate camera 174, to allow the user to take pictures or record video, while remaining in low emission mode. In some embodiments when the user activates camera 174, the display will remain dark and will not display the normal view from the camera on the display, but may leave the screen dark. In another embodiment when the camera is active in low emission mode the display may be darker than compared to a normal display of the image from the camera. When a camera is activated in the low emission mode, a light adjustment for the display may be available so that the display brightness may be adjusted.

Figure 6:
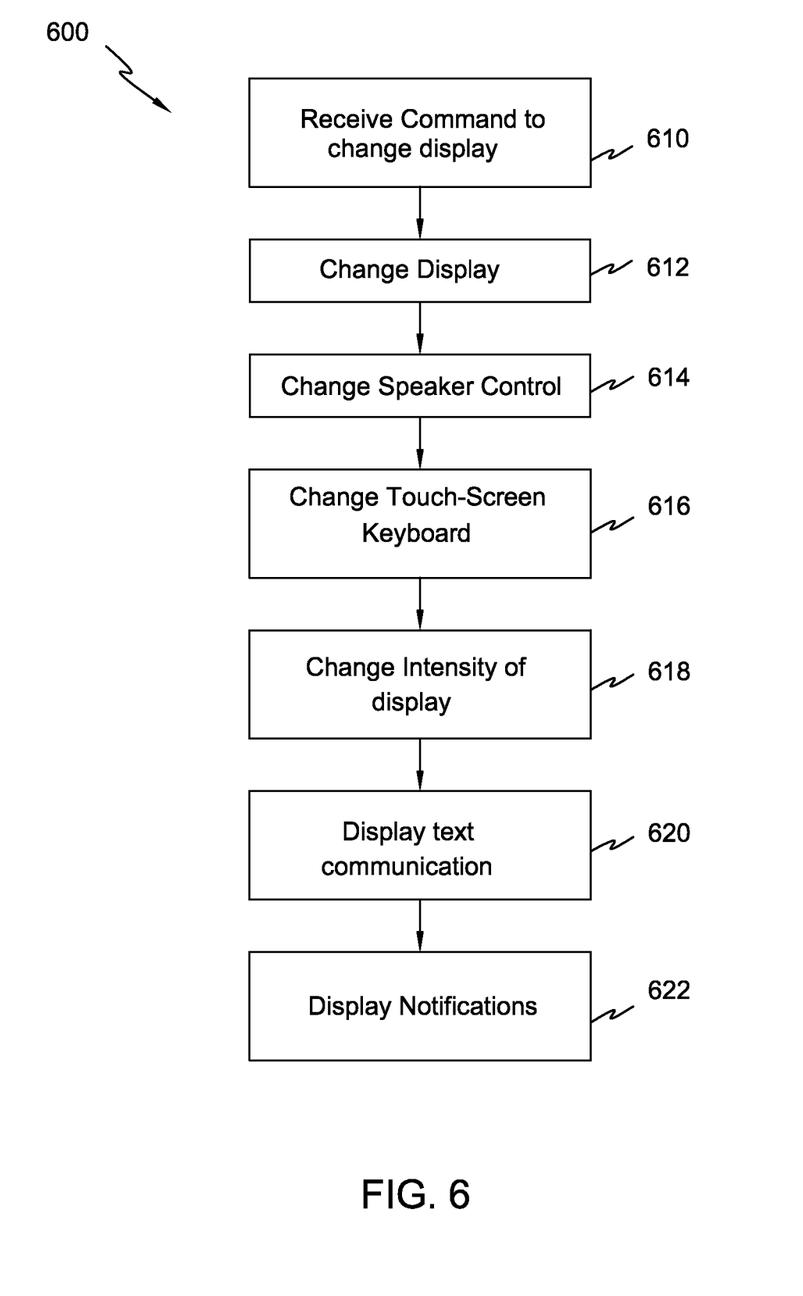
FIG. 6 is an example flow chart of a method according to one embodiment.

FIG. 6 shows an example embodiment of a method 600 of placing an electronic device into a low emission mode. The method 600 in FIG. 6 is one example and one or more steps may be added or removed from this example method in other embodiments of the method of placing an electronic device into a low emission mode.

An application on a device may receive a command 610 to change the display. As discussed above, this command may be from a user activating the application, or through the user activating the low emission mode through the application, through sensing conditions that indicate that entering low emission mode is desired, through receiving an external signal or from another source or a combination of sources. For example, the command 610 may be a scheduled command where the user, or an external source has scheduled for the electronic device to enter low emission mode at a designated time. In some embodiments the command 610 may direct the device to remain in low emission mode for a set length of time unless a user manually exits the low emission mode. In some embodiments, for example, a user can set the low emission mode to be active at one set time for a limited amount of time, or may be set to be active on a recurring basis at the same time on a daily, weekly or other regularly scheduled time. The scheduling may also be integrated with other programs such as a calendaring program, so that the calendaring program allows an option to turn on or off the low emission mode for the duration of a scheduled event on the calendar. In the example of using a calendaring program to enable low emission mode, the calendaring program may prompt a user when the event is created in the calendar to enable a low emission mode during the event.

In the example embodiment, once the command 610 is received, the application on the device changes the display 612 to a low emission mode display. In some embodiments the low emission mode display changes all pixels which display light to only display in a color that has low reflection off of human skin, such as a red color. In this way when a user uses the device in a low light environment, minimal light from the device will be reflected off of the users face or other skin, thereby minimizing disturbance to people around the user.

The application may also change the speaker control 614 so that the speakers do not emit sound, and thereby minimize or eliminate disturbances to people around the electronic device user. The electronic device may be placed in a vibrate only mode if it has a device for delivering vibration notifications, or in a silent mode where no vibrations or sounds are used while in the low emission mode.

Another step in the method 600 may be changing the touchscreen keyboard 616. Communication applications on the electronic device may use a touch screen keyboard. The electronic device may have a default keyboard that is used to input communications from multiple applications. In the example method 600 a low emission version of a keyboard is used in multiple applications that use a touch screen keyboard for input. The low emission touch screen keyboard may be similar to the keyboard shown in FIG. 1 or may have other configurations. The low emission touch screen keyboard in this embodiment is in a red color with a black background.

Another step in the example method 600 is changing the intensity of the display 618. In a completely dark environment, text and symbols displayed in red may be read at a low intensity setting, such as a setting below 50% of the maximum intensity that each pixel may emit. In partially dark environments a higher level of display intensity may be needed to read the screen. In one example method the intensity of the display is changed 618 to less than the highest intensity setting when the electronic device is placed in low emission mode. The application may have a function to adjust the intensity setting of the display. In an example method a user may adjust the starting intensity of the display so that they can choose the initial intensity level of the display that will be used when the device is placed in low emission mode.

The example application may display text communication 620. The application may be used to communicate with text based messages and display text based messages to the user in low emission mode. Text communication may include, but are not limited to text messages, email, instant messages, chat, web search results, blogs, websites, social media and RSS feeds.

The application may also display notifications 622. One example notification is shown in FIG. 3 where notification of a phone call is shown. In the example of FIG. 3 the notification occupies the entire screen. Notifications may also occupy a small portion of the screen, or change the display of an icon on the screen to indicate a message received or some other status change. Icons representing different applications may be displayed, for example, at the top or bottom of the display, and a notification may change one of the icons to indicate new information is available.

The application may use information received from a caller ID as part of the incoming call to display the person calling, and it may also use information from the address book to determine the display of who is calling. In some embodiments a user may enable a setting to only allow notifications of phone calls or other communications when they are from contact stored in the address book when the electronic device is in low emission mode. Calls which are received but not displayed with a notification may be sent to a voicemail or other application, and may be logged by the electronic device so that a user may later determine what attempts at communication were made while the electronic device was in low emission mode. Additionally, a user may select that notifications are shown for only specific people in the address book.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. A method of reducing disturbance of a hand-held electronic communication device to non-users of the hand-held electronic communication device, the hand-held electronic communication device including a display that emits light and delivers notifications to the display regarding communications, a speaker control system and a speaker, the method comprising:

Receiving a command, with a processor, to change a display mode of the hand-held electronic communication device;

Changing the display from a normal mode to a low emmission mode in response to the command to change the display mode of the hand-held electronic communication device, wherein the normal mode emits light from the display that includes white light, and wherein the low emission mode presents information on the display, wherein the display, while in low emission mode, emits no white light and changes substantially all the light emitted from the display to be in one or more frequency ranges that are substantially absorbed by human skin;

Changing the speaker control system to a silent mode in response to the command to change the display mode of the hand-held electronic communication device, wherein the silent mode does not allow the speaker to emit sound;

Displaying the notifications, on the display, while in the low emission mode without accompanying sound and without white light;

Receiving a command, with the processor, to exit the low emission mode; and displaying a notification of the command to exit low emission mode that requires confirmation from a user.

2. The method according to claim 1 wherein Changing the display from the normal mode to the low emission mode of the hand-held electronic communication device includes restricting light emitted from the display to be in a frequency range of 405 to 480 THz to substantially restrict the light to only light which is absorbed by human skin.

3. The method according to claim 1 wherein the low emission mode limits light emitted from the display to substantially all red colored light.

4. The method according to claim 1 wherein the low emission mode limits light emitted from the display to substantially all green colored light.

5. The method according to claim 1 wherein the low emission mode limits light emitted from the display to substantially all blue colored light.

6. The method according to claim 1 wherein the display is a touch screen display, and wherein the touch screen display has a keyboard function that allows the touch screen display to accept keyboard input by representing a keyboard on the touch screen display and recognizing contact with the keyboard as input, the method further comprising:

changing the keyboard function, in response to the command to change the display mode, to show the keyboard on the touch screen display with a black background and keys of the keyboard with no white light, and only light in the one or more frequency ranges that are substantially absorbed by human skin.

7. The method according to claim 1 wherein the display has a control to adjust an intensity of one or more elements of the display, so that the light emitted from the one or more elements of the display is adjusted from a lowest intensity to a highest intensity, and where the low emission mode changes the intensity of one or more elements of the display to an intensity that is less than the highest intensity.

8. The method according to claim 7 wherein the low emission mode changes the intensity of one or more illuminated elements of the display to an intensity that is less than fifty percent of the highest intensity.

9. The method of claim 1 wherein the low emission mode is used for displaying text communication in a low-lit environment.

10. The method according to claim 1 wherein the notifications include a call notification of a current attempt for real-time voice communication by a caller, wherein the call notification includes the command to exit low emission mode that requires confirmation from a user to begin voice communication with the caller.

11. The method according to claim 1 wherein receiving the command, with the processor, to change the display mode of the hand-held electronic communication device further includes receiving input from a user to immediately place the hand-held electronic communication device into the low emission mode.

12. The method according to claim 1 wherein receiving the command, with the processor, to change the display mode of the hand-held electronic communication device further includes receiving input through wireless communication from an external source with direction to place the hand-held electronic communication device into the low emission mode.

13. The method according to claim 1 wherein receiving the command, with the processor, to change the display mode of the hand-held electronic communication device further includes receiving input to change the display mode of the hand-held electronic communication device to the low emission mode for a specified time period.

14. The method according to claim 1 wherein receiving the command, with the processor, to change the display mode of the hand-held electronic communication device further includes receiving input to change the display mode of the hand-held electronic communication device to the low emission mode at a future specified time.

15. The method according to claim 1 wherein the low emission mode allows two or more text based communication programs to operate with the hand-held electronic communication device in the low emission mode.

16. A hand-held electronic communication device comprising:
   a display;
   memory;
   speaker control system;
   a speaker;
   one or more processors; and
   one or more modules stored in the memory and configured for execution by the one or more processors, the one or more modules including instructions:
      receiving a command by the one or more processors to change a display mode of the hand-held electronic communication device;
      changing the display to a low emission mode in response to the command to change the display mode of the hand-held electronic communication device, wherein the low emission mode presents information on the display and delivers notifications to the display regarding communications, wherein the display, while in low emission mode, emits no white light and changes substantially all light emitted from the display to be in one or more frequencies of light that is substantially absorbed by human skin;
      Changing the speaker control system to a silent mode in response to the command to change the display mode of the hand-held electronic communication device, wherein the silent mode does not allow the speaker to emit sound;
      Displaying the notifications, on the display, while in the low emission mode without accompanying sound and without white light;
      Receiving a command, with the processor, to exit the low emission mode; and
      displaying a notification of the command to exit low emission mode that requires confirmation from a user.

17. A non-transitory computer readable storage medium storing one or more programs, the one or more programs comprising instructions, which when executed by a hand-held electronic communication device with a display, a speaker control system and a speaker, cause the hand-held electronic communication device to perform a method comprising:
   receiving a command, by a processor, to change a display mode of the hand-held electronic communication device;
   changing the display to a low emission mode in response to the command to change the display mode of the hand-held electronic communication device, wherein the low emission mode presents information on the display and delivers notifications to the display regarding communications, wherein the display, while in low emission mode, emits no white light and changes substantially all light emitted from the display to be in one or more frequencies of light that is substantially absorbed by human skin;
   Changing the speaker control system to a silent mode in response to the command to change the display mode of the hand-held electronic communication device, wherein the silent mode does not allow the speaker to emit sound;
   Displaying the notifications, on the display, while in the low emission mode without accompanying sound and without white light;
   Receiving a command, with the processor, to exit the low emission mode; and
   displaying a notification of the command to exit low emission mode that requires confirmation from a user.

* * * * *